INVENTOR
HARRY L. JENSEN
BY Don Finkelstein
ATTORNEY

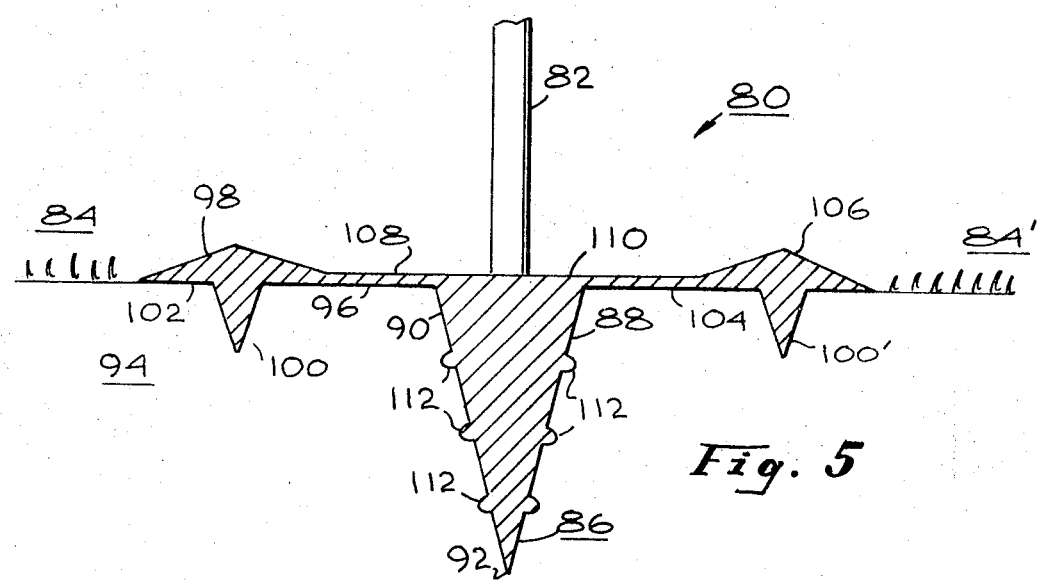
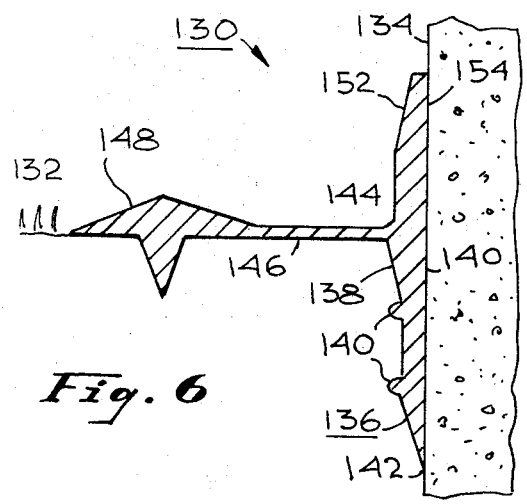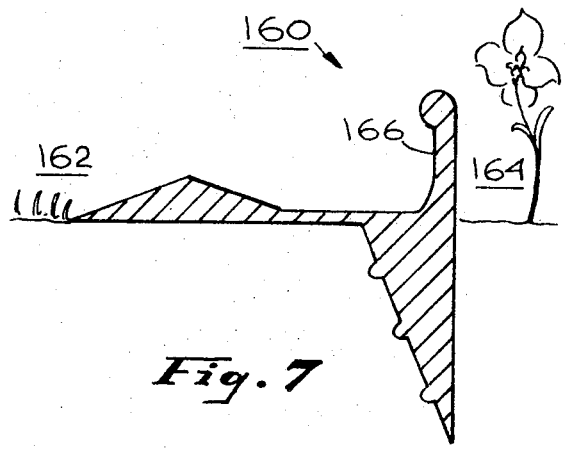
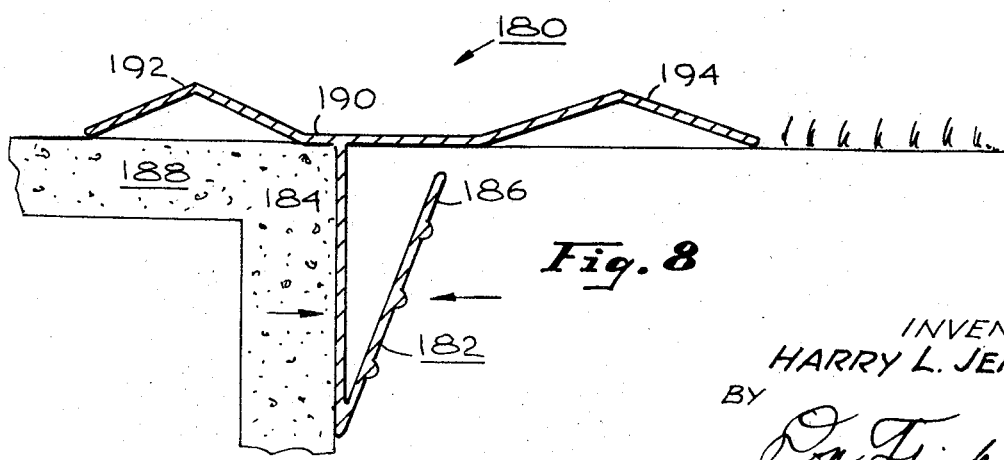

United States Patent Office 3,545,127
Patented Dec. 8, 1970

3,545,127
LAWN EDGING ARRANGEMENT
Harry L. Jensen, Clark County, Nev.
(2300 Marlin Ave., Las Vegas, Nev. 89101)
Filed Aug. 30, 1968, Ser. No. 756,460
Int. Cl. E01c *11/22;* A01g *1/08*
U.S. Cl. 47—33                                6 Claims

ABSTRACT OF THE DISCLOSURE

There is disclosed herein an improved lawn edging arrangement for positioning adjacent, for example, a sidewalk to provide a neat and trim appearance of the lawn in the regions adjacent the sidewalk. The lawn edging arrangement is an elongated strip-like member that may be joined together in sections as desired to provide any desired contour and has a leg member insertable in the ground adjacent, for example, the portion of the sidewalk below the top level of the soil and another portion extending outwardly from the leg portion to overlie the top surface of the soil. A body member is coupled to this other portion remote from the leg and the web member joins the body member to the leg. The body member has a thickness greater than the web member to define a lawnmower wheel track along the top surface of the web member. The thickened body member provides rigidity to the structure for maintaining the lawn edger in place on the top of the soil and the flexibility of the web allows the body member to be raised slightly and then replaced on the top surface to kill any grass that may be immediately adjacent thereto.

BACKGROUND OF THE INVENTION

Field of the invention

This invention relates to the lawn edging art and more particularly to an improved lawn edging arrangement that may be provided in elongated strips and insertable in the ground adjacent the lawn to be edged adjacent sidewalks, buildings, flower beds or the like.

Description of the prior art

In many applications it is desirable to provide a neat and trim appearance of a lawn along the boundaries thereof. When the boundaries of the lawn are immediately adjacent to a sidewalk, building wall, flower bed or the like, it is often difficult to provide a neat and trim appearance thereof because of the spacing of conventional lawnmower wheels or even edger members to provide the clearance necessary therefor. Further, in trimming lawns adjacent to sidewalk areas, the cut grass tends to fall onto the sidewalk requiring additional sweeping processes to clean the entire sidewalk area of the cut grass that happens to blow thereon. Further, it will be appreciated, it is often difficult to trim precisely up to the edge of any type of lawn edger and, therefore, it is often desired to have the lawn edger flexible so it may be periodically lifted from the ground and immediately adjacent grass such as Bermuda grass or the like tending to grow over the lawn edger falls under the lawn edger when it is reinserted in the ground to provide neat and trim appearance.

Additionally, it is often desirable to keep the blades of the lawnmower from striking the sidewalk or other paved areas immediately adjacent the lawn to be trimmed so that the lawnmower will have a greater life and retain its sharpness for a longer period of time. Such an edging material should also be comparatively easy to install and should be bright and attractive looking to fit in with the decor of any lawn or garden area.

To the best of applicant's knowledge, none of the prior art edging arrangements for lawns have been able to provide the above desiderata. Certain of the prior art lawn edgers have merely comprised thin walled vertical members inserted in the ground adjacent to lawns which have the primary purpose of preventing the growth of grass into adjacent areas by extending below the root level of the grass. Other prior lawn edgers have comprised substantially rigid members or hinged members in which one portion extends into the ground and another portion extends over the edge of the lawn to be trimmed. Such prior art lawn edgers have not been able to maintain, for example, adjacent sidewalk areas free of trimmed grass when the grass is cut or have been comparatively expensive to fabricate and difficult to install.

SUMMARY OF THE INVENTION

Accordingly, it is an object of applicant's invention herein to provide an improved lawn edging arrangement.

It is another object of applicant's invention herein to provide a lawn edging arrangement that may be comparatively economically fabricated, easily installed and requiring little or no maintenance.

It is yet another object of applicant's invention herein to provide an improved lawn edging arrangement that is fabricated in an attractive manner for adding aesthetic values to lawn and garden areas.

The above and other objects are achieved, according to the broad aspect of applicant's invention, by providing a strip-like elongated flexible lawn edging arrangement that is unitarily fabricated from, for example, a plastic such as polyurethane, polyethylene, or the like. The lawn edging arrangement is provided with a tapered leg member having a first side and a second side tapering together to define a narrow or sharpened bottom edge that is inserted into the soil immediately adjacent to the lawn that is to be edged. The leg member has a widened top edge at the top of the soil level.

A first flexible planar web member is coupled to the widened top edge of the leg member and extends in substantially right angles thereto and has a bottom surface that overlies the top surface of the soil immediately adjacent to the lawn to be edged and adjacent to the leg member inserted in the ground. The flexible web member also has a top surface.

A first body member which, in this embodiment of applicant's invention, may be triangular in cross-sectional area, is coupled to the first web member in spaced apart relationship to the leg member and the body member has a planar bottom surface that is substantially coplanar with the bottom surface of the web member and the apex of the triangular body member extends above the top surface of the web member.

When this embodiment of applicant's invention is utilized adjacent to the sidewalk, there is also provided a second body member that, for example, may also be triangular in cross section as coupled to the top edge of the leg member and has at least a lip portion extending therefrom a preselected distance on the opposite side of the leg member from the first web member so that the lip portion overlies the top surface of the sidewalk immediately adjacent to the lawn. The second body member also has a thickness greater than the thickness of the web member so that the first body member and second body member define a lawnmower wheel track intermediate the first body member and second body member along the top surface of the first web member. It will be appreciated that the lawnmower track also acts as a grass trimming trap in which cut grass may be thrown during the cutting of the lawn adjacent to the lawn edger and prevents the cut grass from blowing onto the sidewalk. Because of the trough-like configuration of the lawnmower wheel track between the two thickened portions of the first body member and second body member, it may be conveniently hosed out or swept out to remove any debris that collects therein.

BRIEF DESCRIPTION OF THE DRAWINGS

The above and other embodiments of applicant's invention may be more fully understood from the following detailed description taken together with the accompanying drawings wherein similar reference characters refer to similar elements throughout and in which:

FIG. 5 illustrates another embodiment thereof;
FIG. 6 illustrates another embodiment thereof;
FIG. 7 illustrates another embodiment thereof;
and
FIG. 8 illustrates another embodiment of the invention.

Referring now to FIG. 1, there is shown one embodiment of applicant's invention generally designated 10 of an improved lawn edging arrangement for providing an edge to a lawn 12 that, in this embodiment of applicant's invention, may be adjacent to a sidewalk 14.

Figure 1:
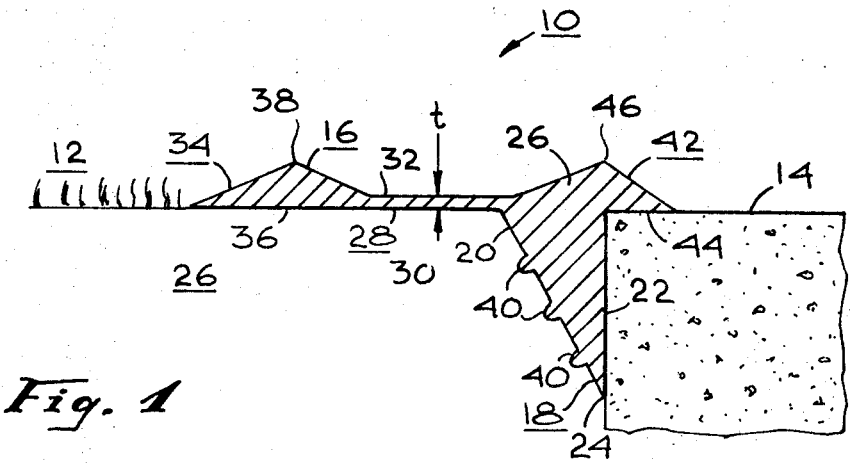
FIG. 1 is a section view illustrating one embodiment of applicant's invention of an improved lawn edging arrangement.

The lawn edging arrangement 10 is comprised of a strip-like elongated flexible means 16. It will be appreciated that the lawn edging arrangement 10 extends into and out of the plane of the paper in as long a section as desired.

The lawn edging arrangement 10 has a leg member 18 having a first side 20 and a second side 22 tapering together to define a narrow bottom portion 24. It will be appreciated that the narrow bottom portion 24 may be knife-like or made very thin in order to facilitate insertion into the soil 26. The leg member 18 has a widened top edge 26 to which there is coupled a first flexible planar web member 28 having a first preselected thickness as indicated by the letter $t$. The web member 28 extends a preselected distance outwardly from the leg member 18 and the bottom surface 30 of the web member 28 overlies the top surface of the soil 26 immediately adjacent to the leg member 18 and the lawn to be edged 12. The thin flexible web member 28 is also provided with a top surface 32.

A first body member 34 having a preselected cross section area which, for the embodiment of applicant's invention shown in FIG. 1, is triangular, is coupled to the web 28 in spaced apart relationship to the leg member 18. The first body member 34 has a planar bottom surface 36 and is substantially coplanar with the bottom surface 30 of the first web member 28 and the bottom surface 36 of the first body member 34 also overlies a top surface of the soil 26 adjacent the lawn 12 to be edged. The apex 38 of the first body member 34 is spaced above the upper surface 32 of the first web member 28 so that the first body member 34 has a second preselected thickness that is greater than the thickness $t$ of the web member 28.

In the embodiment of applicant's invention shown in FIG. 1, the first side 20 of the leg member 18 is provided with a plurality of rib means 40 that protrude from the surface of the side 20 and extends substantially throughout the elongated length of the leg member 18. Applicant has found that the rib members may be included, if desired, in any of the embodiments of applicant's invention to aid in retaining the leg member 18 in the ground and they act as a further anchoring means.

When the embodiment of applicant's invention shown in FIG. 1 is utilized adjacent to the sidewalk 14, applicant prefers that the second side 22 of the leg member 18 be substantially perpendicular to the plane defined by the lower surface 30 of the web member 28 and lower surface 36 of the first body member 34. Additionally, a second body member 42 is provided coupled to the top edge 26 of the leg member 18 and the second body member 42 is, in this embodiment of applicant's invention, similar to the first body member 34 in that they are both substantially triangular in cross sections. The second body member 42 has a lip portion 44 that overlies a preselected portion of the top surface of the sidewalk 14 immediately adjacent to the soil 26 and the apex 46 of the triangular body member 42 provides a thickness greater than the thickness $t$ of the web member 28 so that there is defined a trough-like lawnmower wheel track along the top surface 32 of the web member 28 between the first body member 34 and the second body member 42. Applicant has found that when the lawn 12 is trimmed or the top of the sidewalk 14 is swept up, the trough-like configuration of the upper surface 32 of the web 28 between the raised body members 34 and 42 provides a convenient trap for loose dirt, dry or trimmed grass or the like. After sweeping or cutting is finished, the trough-like track may be conveniently hosed out or swept out to minimize the maintenance required in maintaining a neat appearance around the lawn 12 to be edged.

If grass tends to grow up over the body member 34, applicant has found that it is quite convenient to merely raise the body member 34, flexing the web member 28 and then allow the first body member 34 to return to place. Grass immediately adjacent thereto is trapped under the lower surface 36 of the first body member 34 and is therefore killed and thus a sharply defined edge to the lawn 12 may be easily maintained. When it is desired to cut the grass 12, one wheel of the lawnmower (not shown) may be placed in the track on the upper surface 32 of the first web member 28 and the blades then are sufficiently above the body member 34 so that we do not cut it but do cut the grass 12 of the lawn to be edged.

It will be appreciated that in this, as well as any of the embodiments of applicant's invention described herein, the decorative aspects of the lawn edger may be made as plain or fancy as desired within the scope of applicant's invention herein. That is, various colors and/or ornamentation may be added to provide as pleasing or aesthetic an appearance to the lawn edging arrangement as may be desired.

Figure 2:
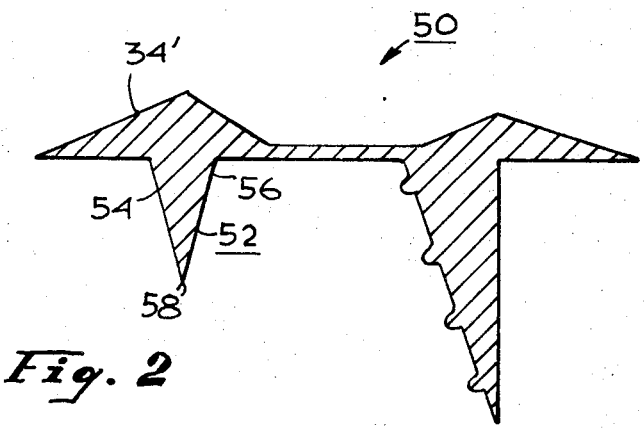
FIG. 2 illustrates another embodiment thereof.

In the embodiment of applicant's invention shown in FIG. 2 wherein a lawn edging arrangement 50 is illustrated and the lawn edging arrangement 50 is generally similar to the lawn edging arranging 10 shown in FIG. 1 except that in the lawn edging arrangement 50 there is provided a secondary leg member 52 coupled to the first body member 34' thereof. The secondary leg member 52 has a first side 54 and a second side 56 tapering together to define a narrow or sharp edge 58 to allow easy insertion in the ground. The secondary leg member 52 aids in maintaining the lawn edging arrangement 50 in place and may be required in certain applications of applicant's invention. It will be appreciated, of course, that the secondary leg member 52 may be incorporated in any of the embodiments of applicant's invention disclosed herein to provide additional structural rigidity and additional retention power for retaining the lawn edger in the ground.

Figure 3:
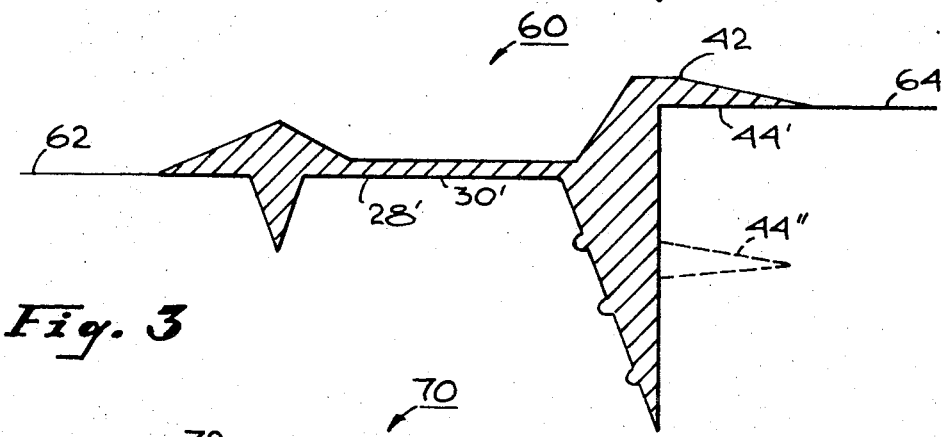
FIG. 3 illustrates another embodiment thereof.

In the embodiment of applicant's invention shown in FIG. 3 there is illustrated a lawn edging arrangement generally designated 60 that may be utilized adjacent to a lawn to be trimmed that is near a sidewalk in a manner similar to the arrangement shown in FIG. 1. However, in this embodiment of applicant's invention the lip portion 44' of second body member 42 is vertically offset from the plane defined by the lower surface 30' of a first web 28'. Thus, the level of the soil 62 may be lower than the level of the sidewalk 64 and thus the offset configuration is desired so that such sidewalk configurations can be accommodated. It will be appreciated, of course, that a reversal offset may also be provided according to applicant's invention herein by lowering the lip portion 44′ to a position indicated by the dotted lines and designated as 44″ to accommodate situations where the level of the sidewalk is lower than the level of the adjacent soil or lawn to be trimmed.

Figure 4:
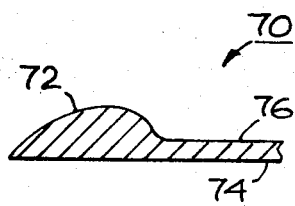
FIG. 4 illustrates another embodiment thereof.

While the above embodiments of applicant's invention have illustrated the first and/or second body member as generally triangular or truncated triangular, as shown in FIG. 3, it will be appreciated that the first or second body members as may be included may have other cross sectional area configurations. FIG. 4 illustrates another embodiment of applicant's invention generally designated 70 in which the first body member 72 is provided with a semicircular cross sectional area. Thus, applicant prefers that the body members have a greater thickness than the adjoining web member such as the web member 74 in FIG. 4 to provide the trough-like lawnmower wheel track on the upper surface 76 of the weblike member 74.

FIG. 5 illustrates another embodiment of applicant's invention generally designated 80 which may be utilized underneath and adjacent a fence such as a cyclone fence 82 to provide a neat trim lawn 84 on either side thereof. Further, as described below, it is often found to be a problem that debris, paper and other materials tend to accumulate along such fences as the fence 82 and applicant's invention herein provides that an inexpensive, attractive and convenient collector for such debris that allows rapid cleaning thereof. As shown in FIG. 5 there is provided a leg member 86 having a first side 88 and a second side 90 tapering together to provide a narrow or sharpened edge 92 at the bottom thereof to allow convenient insertion in the soil 94. In this embodiment of applicant's invention, the leg member 86 is positioned substantially directly beneath the fence 82. The first web member 96 and first body member 98 which may be similar, respectively, to the first web member 28 and first body member 34 shown in FIG. 1 are coupled to the leg member 86 and extend outwardly therefrom in a first direction away from the fence 82 towards the lawn 84 to be trimmed. A secondary leg member 100 which, for example, may be similar to the secondary leg 52 shown in FIG. 2 may be included as coupled to the bottom surface 102 of the first body member 98.

A second web member 104 and second body member 106 which may be similar to the first web member 96 and first body member 98 are also coupled to the leg member 86 and extend outwardly therefrom in a direction opposite to the direction of the first web member 96 and away from the fence 82 towards the other portion 84′ of the lawn to be trimmed. The second body member 106 may also be provided with a second secondary leg member 100′ which may be similar to the first secondary leg member 100 coupled to the first body member 98. In this embodiment of applicant's inventions, the thickened first body member 98 and the fence 82 define a first trough-like lawnmower wheel track along the upper surface 108 of the first web 96 and, similarly, the second body member 106 of the fence 82 provide a second trough-like lawnmower wheel track along the upper surface 110 of the second web member 104. Thus, lawns may be maintained neat and trim up to comparatively close areas to a fence 82 by utilizing the lawn edging arrangement 80 shown in FIG. 5, and, further, debris such as paper or miscellaneous other items that tend to collect along the fence may be conveniently swept or hosed away along the trough-like lawnmower wheel tracks on either side of the fence 82.

The leg member 86 shown in the lawn edging arrangement 80 of FIG. 5 has rib-like protuberances 112 on both the first side 88 and second side 90 thereof and the rib-like protuberances 112 may be similar to the rib means 40 shown in FIG. 1 and serve the same purpose.

FIG. 6 also shows another embodiment of applicant's invention generally designated 130 which may be utilized where there is a lawn 132 that is to be edged immediately adjacent to a building wall 134. As shown in FIG. 6 there is provided a leg member 136 having a first side 138 on which there may be included, if desired, rib-like protuberances 140 to aid in retaining the leg member 136 in the ground. The first side 138 and a second side 140 of the leg member 136 taper together to provide a narrow or sharpened edge 142 at the bottom thereof. In general, the leg member 136 is similar to the leg member 18 shown in FIG. 1, and there is coupled to the thickened upper edge 144 thereof a first web member 146 similar to the first web member 28 shown in FIG. 1 and a first body member 148 which may be similar to the first body member 34 shown in FIG. 1. Additionally, if desired, a secondary leg member 150 may be coupled to the first body member 148 and a secondary leg member 150 may be similar to the secondary leg member 52 as shown in FIG. 2.

However, in this embodiment of applicant's invention shown in FIG. 6 there is provided a second body member 152 having a thickness greater than the thickness of the web member 146 in a preferred form of this embodiment of applicant's invention and a second body member 152 extends upwardly above the level of the soil along the building wall 134 and the inner surface 154 of the second body member 152 is substantially coplanar with the second side 140 of the leg member 136 so that a continuous wall of the lawn edging arrangement 130 is adjacent to the building wall 134. Applicant has found that the second body member 152, in this embodiment of applicant's invention, provides several desirable features when so utilized adjacent to the building wall 134. For example, the second body member 152 prevents undue accumulation of water down into the subsoil below the level of the soil adjacent to the wall 134 and it keeps scratches, tracks and markings as may be made by a lawnmower off of the wall 134. Further, the flexibility inherent in the material utilized for applicant's improved lawn edger allows the second body member 152 to be moved away from the wall 134 and insecticide or other type of other spray may be positioned in between to minimize the presence of undesirable insects or the like. The close fit between the second body member 152 and the wall 134 maintains the effectiveness of the spray for a considerably longer period of time since it will not be washed away by water.

In the embodiment of applicant's invention shown in FIG. 7, there is an arrangement designated 160 that is similar to the arrangement 130 shown in FIG. 6 except that instead of being utilized adjacent to a wall, the arrangement 160 is utilized adjacent to a lawn 162 that is to be edged beside a flower bed 164. The upstanding second body member 166 provides a neat and attractive edge to the flower bed 164 as well as allowing close trimming of the lawn 162 thereto. Further, applicant has found that the decorative aspects of a lawn edger such as the lawn edger 160 around a flower bed adds considerably to the aesthetic appearance of both the lawn and the flowers. Additionally, the upstanding second body member 166 permits differential watering of the lawn 162 and the flower bed 164.

FIG. 8 illustrates another embodiment of the invention herein and the particular structure shown by FIG. 8 is, of coarse equally adaptable to any of the other embodiments of the invention described herein. That is, the thin web or thin wall construction for the leg members, body members, secondary leg members or the like can be utilized in any of the configurations of applicant's invention herein.

As shown on FIG. 8, this embodiment, generally designated 180, of the invention is similar to the application of the embodiment shown in FIGS. 1 and 2 as well as FIG. 5. That is, it may equally well be utilized adjacent to a sidewalk, as indicated for FIGS. 1 and 2 wherein the sidewalk and lawn are at the same level, in FIG. 3 wherein the sidewalk and lawn are at different levels, as well as for the embodiment of FIG. 5 which is very similar to the arrangement shown in FIG. 8, and the embodiments of FIGS. 6 and 7 wherein the invention is placed either adjacent a wall or with another vertical standing member to protect a flower bed.

The embodiment generally designated 180 comprises a tapered leg member 182 that is placed adjacent to a sidewalk 188 having a vertical portion 184. The leg member 182 is comprised of a thin web section having a pair of side portions joined at the bottom to define an edge and having a generally triangular shape. Outwardly directed side portion 186 has a plurality of ribs, similar to the ribs shown in FIGS. 2, 3, 5 and 6.

A thin web-like member 190 is coupled to the top of the triangular shaped leg member 182 and has a first body member 192 comprised of a thin wall structure coupled thereto and extending from the web member in a first direction being the direction of the sidewalk and overlying a portion of the sidewalk, and a second body member 194 comprised also of a thin wall extending from the web member 190 and overlying the lawn. The first body member 192 and second body member 194 define a lawnmower track along the top surface of the web 190. In the first body member 192 and the second body member 194 the generally triangular shape defining the cross-sectional configuration thereof is provided by a thin web or thin wall section rising to an edge vertically disposed above the sidewalk and the lawn at a thickness greater than the thickness of the web member 190 to provide the above-mentioned mowing track.

This concludes the description of applicant's invention of his improved lawn edging arrangement. Those skilled in the art may find many variations and adaptations of applicant's invention and, it will be appreciated, many variations and combinations of the various structural features and elements described in the several embodiments of applicant's invention herein may be combined as desired to provide various types of lawn edging configurations.

I claim:

1. An elongated strip-like lawn edging arrangement comprising, in combination:
    a tapered leg member having a first side and a second side tapering together to define a narrow bottom edge for insertion in the soil adjacent a lawn to be edged, and having a widened top edge, and at least one of said first side and said second side of said leg member has a plurality of rib means protruding therefrom and extending substantially throughout the elongated length thereof;
    a first flexible planar web member having a first preselected thickness coupled to said leg member and extending a preselected distance therefrom in a first direction and having a lower surface for overlying the top surface of the soil adjacent the lawn to be edged, and a top surface;
    a first body member having a triangular cross section having a second preselected thickness greater than said first preselected thickness coupled to said first web member in spaced apart relationship to said leg member, and having a bottom surface and a top surface and said top surface having at least a portion thereof spaced above said top surface of said web member;
    said first side of said leg member adjacent said web member has said rib means and said second side thereof extends substantially perpendicularly to said bottom surface of said web member for positioning adjacent a side edge of a sidewalk, and said leg member defining a triangular configuration;
    and a second body member similar to said first body member and coupled to said top edge of said leg member adjacent said second side thereof, and said second body member having at least a lip portion extending a preselected distance over the top surface of the sidewalk, and said second body member and said first body member defining a lawnmower wheel track along said top surface of said web member intermediate said first and second second body members.

2. The arrangement defined in claim 1 and further comprising:
    a secondary leg member coupled to said lower surface of said first body member; and
    said secondary leg member having a first side and a second side tapering together to define a triangular cross section having a narrow bottom edge for insertion in the ground.

3. The arrangement defined in claim 2 wherein:
    said tapered leg member, said first body member, said secondary leg member and said second body member are comprised of thin wall, web-like portions.

4. The arrangement defined in claim 1 wherein:
    said lip portion of said second body member is vertically displaced from said web member and is spaced a preselected distance above said web member.

5. The arrangement defined in claim 1 wherein:
    said lip portion of said second body member is vertically displaced from said web member and is spaced apart a preselected distance below said web member.

6. The arrangement defined in claim 1 wherein:
    said tapered leg member, said first body member and said second body member are comprised of thin wall, web-like portions.

References Cited

UNITED STATES PATENTS

| | | | |
|---|---|---|---|
| 352,146 | 11/1886 | Oungst | 47—33 |
| 606,151 | 6/1898 | Johnson | 47—33 |
| 670,001 | 3/1901 | Morss | 94—31 |
| 1,979,979 | 11/1934 | Martini | 47—33 |
| 2,782,561 | 2/1957 | Smith | 47—33X |
| 2,994,255 | 8/1961 | Trief et al. | 94—31 |
| 3,378,949 | 4/1968 | Dorris | 47—33 |
| 3,384,351 | 5/1968 | Turner | 256—32 |
| 3,387,786 | 6/1968 | Rynberk | 47—33UX |

ROBERT E. BAGWILL, Primary Examiner

U.S. Cl. X.R.

94—31; 256—32